Nov. 24, 1970 R. I. VAN NICE 3,543,205

ELECTRICAL WINDINGS

Filed Aug. 5, 1968 2 Sheets-Sheet 1

WITNESSES:

Bernard R. Giegucz

James F. Young

INVENTOR
Robert I. Van Nice

BY Donald R. Lackey
ATTORNEY

Nov. 24, 1970 R. I. VAN NICE 3,543,205

ELECTRICAL WINDINGS

Filed Aug. 5, 1968 2 Sheets-Sheet 2

3,543,205

ELECTRICAL WINDINGS

Robert I. Van Nice, Sharon, Pa., assignor to Westinghouse Electric Corporation, Pittsburgh, Pa., a corporation of Pennsylvania Filed Aug. 5, 1968, Ser. No. 750,351
Int. Cl. H01f *15/14, 27/28*
U.S. Cl. 336—70 12 Claims

ABSTRACT OF THE DISCLOSURE

An electrical winding comprising a plurality of pancake type coils of the high series capacitance, interleaved turn type, for electrical inductive apparatus, such as transformers. The pancake coils include means for presenting a high resistance to high frequency surge currents, by increasing the effective surface resistance of the conductors of which the pancake coils are wound, without detracting from the performance of the winding at line frequency.

BACKGROUND OF THE INVENTION

Field of the invention

The invention relates in general to electrical inductive apparatus, such as transformers and reactors, and more specifically to windings for electrical inductive apparatus of the core-form type.

Description of the prior art

Windings for electrical inductive apparatus, such as transformers and reactors, are subjected to voltage surges due to lightning and switching. These voltage surges may have very steep wave fronts, and are initially distributed across an electrical winding according to the capacitive structure of the conductors and insulation. An indication of how linear a surge voltage will be distributed across an electrical winding may be obtained from the distribution constant $\alpha$ of the winding, which is equal to the square root of the ratio of the ground capacitance $C_g$ to the series capacitance $C_s$, of the winding, i.e., $$\alpha=\sqrt{\frac{C_g}{C_s}}$$

The smaller the distribution constant $\alpha$, the more linear a surge voltage will be distributed across the winding. The ideal distribution would be a straight line corresponding to the inductive distribution of the voltage across the winding, as this would stress the insulation uniformly and prevent a high stress concentration where the surge voltage first enters the winding, as well as eliminating transient oscillating voltages as the voltage distribution changes from capacitive to inductive.

The high voltage winding of an electrical transformer of the core-form type, which is disposed concentrically about a low voltage winding, and which includes a plurality of electrically connected, continuous pancake or disc type coils disposed in spaced, side-by-side relation, has a relatively high distribution constant, with surge potentials concentrating between the first few pancake coils connected adjacent to the line end of the winding, between the conductor turns within the coils, and from these coils to ground. Adding electrical insulation to withstand the stress concentrations is partially self-defeating, as it reduces the series capacitance $C_s$ of the winding, making the distribution of a surge potential across the winding even more non-linear. Further, adding additional electrical insulation is not desirable as it increases the size, cost and weight of the transformer.

These problems with the continuous type of pancake coil led to the development of the high series capacitance pancake coils in which turns from an electrically distant portion of the coil or winding are mechanically disposed between electrically connected turns. This method, generally referred to as interleaving, increases the effective series capacitance of the pancake coils and the winding, it substantially improves the distribution of surge potentials across the winding, and it eliminates the low frequency voltage oscillations associated with pancake coils of the continuous type.

It has now been found, that with certain types of interleaving arrangements, under the influence of very steep wave front, high energy content surge voltages, that extremely high voltage stresses may be produced between the turns of a pancake coil, especially near the mid-point of the radial build of the coil, which may result in failure of the coil insulation. Thus, it would be desirable to provide a high series capacitance winding structure, of the interleaved turn type, which attenuates the high build-up of the turn-to-turn stresses near the center or mid-point of the radial build dimension of the pancake coils which make up the electrical winding.

SUMMARY OF THE INVENTION

Briefly, the present invention recognizes the cause of these high streses to be the result of a resonant voltage peak which occurs at the first resonant frequency of the coils, which, in general, is between 1 and 3 mHz. The turn-to-turn voltage at the first resonant frequency is a maximum between the turns at the mid-point of the radial build of the coil. Thus, while the high series capacitance, interleaved turn type winding eliminates the low frequency oscillations associated with continuous type pancake coils, they may in certain circumstances be subjected to high frequency oscillations. This invention teaches how to reduce the magnitude of the resonance peak, which reduces the voltage stresses at the resonant frequency, without substantially affecting the perforance of the winding at conventional line frequency, for example at 60 Hz. The high frequency resistance of the pancake coils and winding is increased, without a proportional increase in the power frequency resistance, by increasing the effective "surface" resistance of the conductors of which the pancake coils are wound. Since the high frequencey resonant currents flow near the surface of the conductors, due to "skin effect," increasing the effective resistance of the conductors near their outer surfaces will increase the resistance of the winding to the flow of high frequency currents, without a proportional increase in the resistance of the winding to the flow of power frequency currents.

BRIEF DESCRIPTION OF THE DRAWINGS

Further advantages and uses of the invention will become more apparent when considered in view of the following detailed description and drawings, in which.

DESCRIPTION OF PREFERRED EMBODIMENTS

Figure 1:
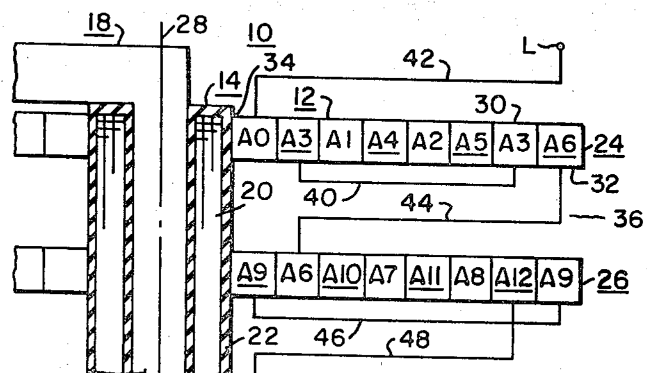
FIG. 1 is a fragmentary cross-sectional view of an electrical transformer of the core-form type, which may utilize the teachings of the invention.

Referring now to the drawings, and FIG. 1 in particular, there is illustrated a partial elevational view of a transformer 10 which may utilize the teachings of the invention. Transformer 10 is of the core-form type, including high and low voltage winding assemblies 12 and 14, respectively, which are concentrically disposed about a leg 16 of a magnetic core assembly 18. Transformer 10 may be single or polyphase, with only one phase being shown in FIG. 1 in order to simplify the drawing.

The low voltage winding 14 may be of any conventional type, including a plurality of conductor turns 20, which are electrically insulated and separated from high voltage winding 12 and magnetic core 18 by insulating means 22.

High voltage winding 12 includes a plurality of pancake or disc type coils, such as pancake coils 24 and 26, which are disposed in spaced, side-by-side relation about the center line 28 of the magnetic core leg 16, with center line 28 being the axis of pancake coils 24 and 26. High voltage winding 12 may have any desired number of pancake coils, and the pancake coils may have any desired number of conductor turns, as required by a specific application.

More specifically, each pancake coil has first and second major opposed surfaces, and a central opening for receiving the leg 16 of the magnetic core 18, and the low voltage winding assembly 14. For example, pancake coil 24 has first and second major opposed surfaces 30 and 32, and an opening 34 for receiving the low voltage winding and magnetic core leg. The plurality of pancake coils are stacked with their openings in alignment, and they are axially spaced along the axis 28, in order to provide cooling ducts, such as cooling duct 36 between pancake coils 24 and 26. The magnetic core-winding assembly of transformer 10 is disposed within a casing (not shown), which may be filled with a suitable insulating and cooling fluid, such as oil or $SF_6$.

The line end pancake coil 24 is connected to the line terminal L, which is adapted for connection to a source of power frequency alternating potential, such as 60 Hz., and the pancake coils are electrically connected to provide a complete winding assembly. The pancake coil at the other end of the winding is either connected to a terminal adapted for connection to ground, or to another line terminal, depending upon the specific application.

In order to increase the through series capacitance of the high voltage winding 12, and obtain a more favorable distribution of surge potentials across the winding, each pancake coil is of the interleaved turn, high series capacitance type. There are many different interleaving arrangements known in the art, which provide different degrees of interleaving, i.e., different voltages between interleaved turns, such as disclosed in U.S. Patent 3,090,022, issued May 14, 1963, which is assigned to the same assignee as the present application. For purposes of example, high voltage winding 12 of transformer 10 is illustrated as having pancake coils of the single conductor, singly interleaved type, i.e., each pancake coil includes a single series path, and one complete interleaving arrangement, with the pancake coils, in this instance, being connected finish-start. The pancake coils may also be connected start-start, finish-finish, if desired.

Each of the pancake coils 24 and 26, such as pancake coil 24, includes two radially interleaved sections, each of which spiral outwardly through the complete radial build of the pancake coil, with their turns appearing at every other turn. Thus, the two radially interleaved sections may be formed by placing two conductors together and winding them about a mandrel, such that the turns build-up radially. The interleaving which places turns from an electrically distant portion of the coil between electrically connected turns, is accomplished by connecting the outer or "finish" end of one radial section, with the inner or "start" end of the other radial section. Thus, the first radial section may start with conductor A0, and it will appear at every other turn, referenced A1, A2 and A3. The second radial section will then start with conductor $\underline{A3}$, and appear at every other turn referenced $\underline{A4}$, $\underline{A5}$, and $\underline{A6}$. The outer end of turn $\underline{A3}$ of the first section is connected to the inner end of turn $\underline{A3}$ of the second section, via interleaving connection 40. The line terminal L may be connected to the inner end of conductor A0, via conductor 42, and the outer end of turn $\underline{A6}$ of the second radial section is connected to pancake coil 26 via finish-start connection 44. Thus, the electrical circuit spirals outwardly through pancake coil 24 twice, with the numerical number of the conductors indicated in FIG. 1, referring to the number of the conductor turn in the winding. The second time the series path spirals outwardly through the pancake coil 24, the reference numerals have a line drawn under them, to distinguish them from the conductor turns which are in the first radial traverse of the coil. Thus, the electrical circuit enters the start of the first radial section at conductor A0, and it spirals outwardly, appearing at every other turn, until reaching the finish of the first radial section, and then returns to the start of the second radial section via the interleaving connection that enters conductor $\underline{A3}$. The finish end of the first radial section and the start end of the second radial section are both given the reference numeral $\underline{A3}$ in order to illustrate that they are substantially the same voltage via their interconnecting lead 40. The circuit then spirals outwardly through the coil build for a second time, appearing at every other turn until reaching the finish end of the second radial section.

The second pancake coil 26 is similar to the first pancake coil 24 in construction, but as disclosed in copending application Ser. No. 716,888, filed Mar. 28, 1968, which is assigned to the same assignee as the present application, when singly interleaved pancake coils are interconnected with finish-start connections, it is preferable to alternate the sequence of traversing the pancake coils, from pancake to pancake across the winding. Thus, since the sequence of traversing pancake coil 24 was through the first and then to the second radial sections, the sequence of traversing pancake coil 26 should be through the second and then through the first radial sections. It has been found that this "interchange" will reduce the magnitude of stress concentrations which may occur when a surge potential is applied to the winding. Therefore, according to the teachings of the hereinbefore mentioned copending application, the finish-start connection 44 enters the start end of the second radial section of pancake coil 26 at conductor A6, and spirals outwardly appearing at every other turn, referenced A7, A8 and A9. The circuit then returns to the start of the first radial section via interleaving connection 46, entering conductor $\underline{A9}$ and again spirals outwardly, appearing at every other turn, referenced $\underline{A10}$, $\underline{A11}$ and $\underline{A12}$. The circuit leaves the finish end of the first radial section via conductor 48, and it proceeds to the start of the first radial section of the next pancake coil, where the sequence described relative to pancake coils 24 and 26 will be repeated, for each pair of pancake coils across the winding.

While high series capacitance windings of the interleaved turn type eliminate the low frequency oscillations associated with the continuous, non-interleaved type pancake coils for core-form electrical inductive apparatus, it has been found that high voltage stresses may be created in an interleaved type pancake coil, near the mid-point of the coil build, when the winding is subjected to a steep front, high energy content surge potential. The magnitude of the stress is affected by the way the pancake coils are interconnected, as disclosed in the hereinbefore mentioned copending application. This application discloses teachings which will reduce the magnitude of these voltage stresses, regardless of how the pancake coils are interconnected. Thus, the teachings of this invention may be applied to make certain pancake coil interconnections, which may heretofore have been unfavorable, now suitable for general use and when the teachings of the invention are coupled with certain winding interconnections which in themselves reduce the voltage stresses, it may make it feasible to apply interleaving to much larger pancake coils and windings, having higher energy contents, without exceeding predetermined design stress levels.

It has been found that the high voltage stresses which appear between conductor turns near the mid-point of the radial build of the pancake coil are due to a resonance peak in the voltage at the first resonant frequency of the pancake coil, which is generally in the range of 1 to 3 mHz., with about 2 mHz. being typical for a singly interleaved pancake coil having 35 turns of electrical conductor, which is .41 inch wide by .057 inch thick, having an outside coil diameter of 32⅝ inches and an inside diameter or coil opening of 25⅛ inches.

Figure 3:
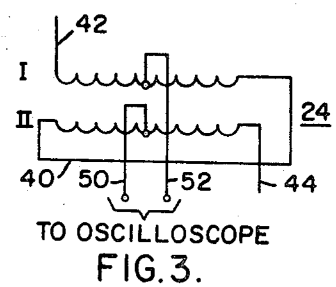
FIG. 3 is a schematic representation of the pancake coil shown in FIG. 2.
Figure 2:
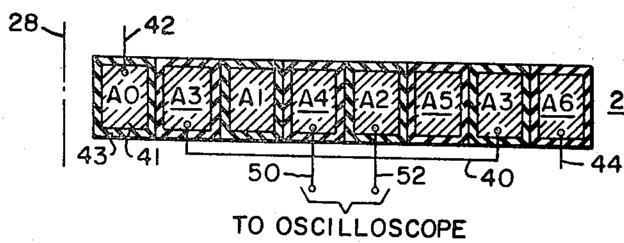
FIG. 2 is a fragmentary cross-sectional view of one of the pancake coils of the transformer shown in FIG. 1.

FIG. 2 is a fragmentary, cross-sectional view of pancake coil 24 shown in FIG. 1, with pancake coil 24 being illustrated as having a single conductive strand per conductor turn, such as conductive strand 41, which is insulated with electrical insulating means 43. It is to be understood, however, that each conductor turn may have a plurality of parallel connected strands, in certain coil ratings, in order to reduce losses due to eddy currents. FIG. 3 is a schematic representation of pancake coil 24 shown in FIGS. 1 and 2, with FIG. 3 clearly illustrating the first and second radially interleaved sections, referenced I and II, respectively. As hereinbefore explained, the high frequency oscillations reach a maximum magnitude between the two turns disposed at the mid-point of the radial build of the pancake coil, which turns are from the first and second radial sections. In order to determine the maximum stresses between these turns, they may be electrically connected to the vertical deflection terminals of an oscilloscope. For example, conductor turns A4 and A2, as illustrated in FIGS. 2 and 3, may be connected to an oscilloscope via conductors 50 and 52, with the oscilloscope recording the maximum voltage which appears between these conductor turns at different frequencies.

Figure 4:
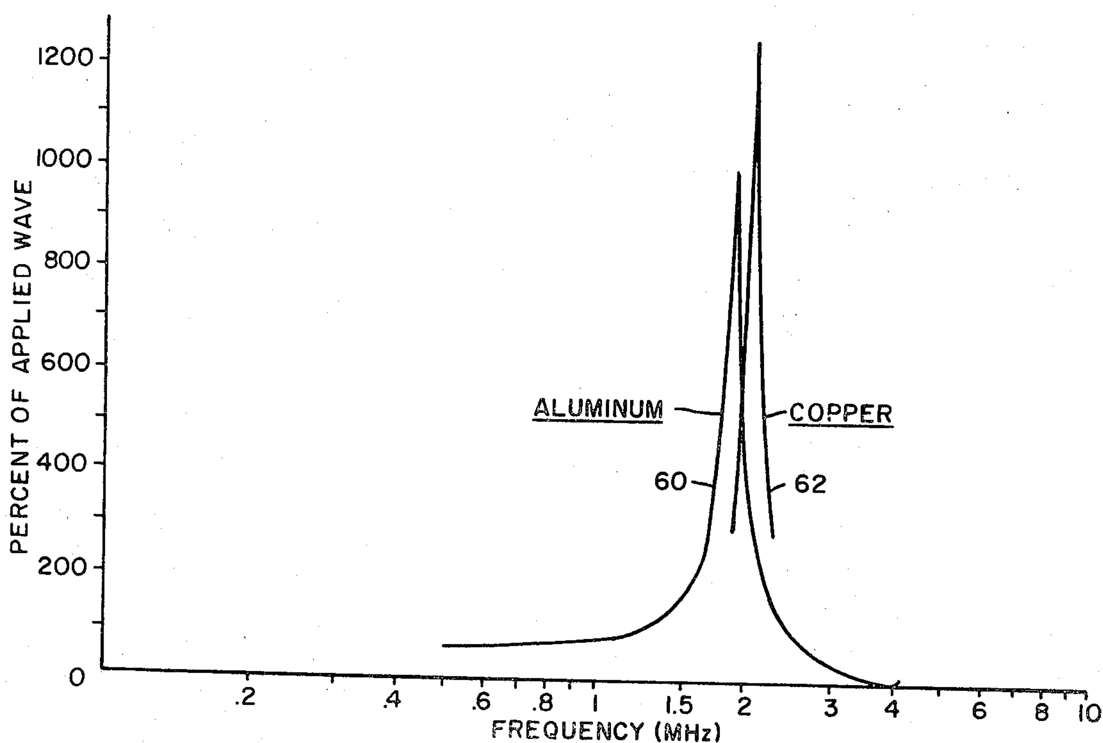
FIG. 4 is a graph which illustrates the stress build-up in an interleaved turn type pancake coil, between turns of the coil at the mid-point of its radial build, due to resonance at the first resonant frequency of the coil.

Two pancake coils, each having 35 turns, with one pancake coil using aluminum conductor, and the other pancake coil using copper conductor, were tested in the manner illustrated in FIG. 2, and the results tabulated to form the curves shown in FIG. 4. FIG 4 is a graph in which the turn-to-turn voltages at the coil mid-point, in percent of the applied voltage, is plotted on the ordinate, versus the frequency, which is plotted on the abscissa. Curve 60 illustrates the voltage versus frequency measured for the singly interleaved pancake coil using aluminum conductor, and curve 62 illustrates the voltage versus frequency curve for a similar singly interleaved pancake coil using copper conductor. It will be noted that the stress between the turns of the two radially interleaved sections is low until reaching about 2 mHz., at which point the coils reach their first resonant frequency. The voltage for the aluminum wound pancake coil peaks at about 1000% of the applied voltage, and the voltage for the copper wound coil peaks at about 1250% of the applied voltage. The copper coil had a smaller diameter than the aluminum coil, which accounts for the copper coil reaching resonance at a slightly higher frequency than the aluminum coil.

An impulse or surge potential applied to a coil or winding of electrical inductive apparatus, due to lightning or switching transients, may have a very steep wave front, and it may also have a steep trailing edge. These abrupt changes in voltage may be analyzed into a continuous frequency spectrum, showing the relative amounts of energy at each frequency. The impulse voltage turn-to-turn at the mid-point of the coil has a frequency spectrum which may be found by multiplying the energy values of the spectrum of the applied wave, by the values of the resonance curve for the coil at the same frequency. Thus, the impulse voltage peak, for any applied surge voltage may be found, with its height being proportional to the frequency spectrum, and since the frequency spectrum is proportional to the height of the resonance curve for the particular coil, anything which reduces the height of the resonance curve will reduce the turn-to-turn stresses in the pancake coil.

It will be observed that the resonance curve 60 for the aluminum would pancake coil peaks at a substantially lower magnitude than the peak of the resonance curve 62 for the copper wound coil. This is due to the higher resistivity of aluminum, than copper, which thus absorbs more energy from the resonance peak than copper, resulting in lower stresses.

Pancake coils for power transformers of the type used by electrical utilities in transforming large blocks of electrical power, have a first resonant frequency in the range of 1 to 3 mHz. At these frequencies, the flow of current is confined to the surface of the conductors, due to skin effect. For example, in a pancake coil wound of copper conductor, the resistance of the conductor to the flow of current at 1 mHz. can be calculated by assuming that the current flows only in a layer .003 inch deep adjacent the outer surface of the conductor. Thus, the resistance of the conductor is quite different at the power frequency of 60 Hz., than it is at 1 mHz.

This invention teaches structure for increasing the high frequency resistance of the conductor in a pancake coil, without a proportionate increase in the resistance of the conductor to power frequency currents.

Figure 5:
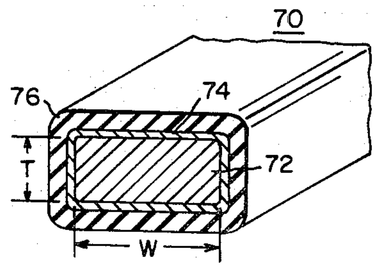
FIG. 5 is a perspective view of an electrical conductor for a pancake coil, constructed according to an embodiment of the invention.

FIG. 5 is a perspective view of an insulated conductor 70, in section, suitable for winding pancake coils of the interleaved turn, high series capacitance type, such as pancake coil 24 shown in FIGS. 1, 2 and 3, with the conductor being constructed according to a first embodiment of the invention. Conductor 70 has at least one conductive strand 72, which is usually rectangular in shape, having a predetermined width dimension W and a thickness dimension T. Typical rectangular wires for electrical power transformers have a thickness in the range of .032–.125 inch, widths in the range of .3–.58 inch, and electrical insulation in the range of 11 to 20 mils on a side. The conductor 70 is wound into a pancake coil such that its width dimension is parallel with the axis of the coil. In other words, the largest cross-sectional dimension is placed against the mandrel when starting to wind a coil, with the conductor turns being superposed one upon the other radially. The conductive strand 72 has a thin coating 74 of electrically conductive material disposed on its outer surface, which material is selected to have a higher electrical resistivity than the electrical resistivity of the conductive strand 72. The thickness of the coating 74 will depend upon its electrical resistivity, and also upon the resonant frequency of the pancake coil which is to be wound from the conductor. The material selected should not have too high a resistivity, as the higher the resistivity, the thicker the coating required, as the depth of current penetration increases with the square root of the materials resistivity. Assuming for purposes of example that the conductive strand 72 is copper, and that the coating 74 is aluminum, the thickness of the aluminum coating may be in the range of 3–6 mils. A thin coating of aluminum on a copper conductive strand reduces the resonant voltage peak of the coil by about the same proportion as illustrated by the curves 60 and 62 in FIG. 4. The coated conductive strand 72 may be electrically insulated in any conventional manner, such as by a coating 76 of a suitable insulating enamel, or by multiple layers of a cellulosic insulation tightly and uniformly wrapped about the conductor.

Figure 6:
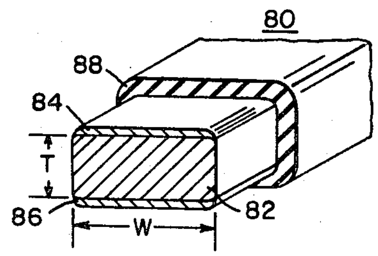
FIG. 6 is a perspective view of an electrical conductor, illustrating a modification of the embodiment of the invention shown in FIG. 5.

FIG. 6 is a perspective view, in section, of an insulated conductor 80 constructed according to another embodiment of the invention, which may be used for pancake coils of the interleaved turn, high series capacitance type. It is believed that the high frequency currents which flow upon a surge voltage, not only are confined to the outer skin of the electrical conductor, but that when the conductors are wound into a pancake type coil, the high frequency currents flow on the surfaces of the conductors which are disposed between the conductor turns. In other words, the surfaces which define the width dimension W of the conductor, when wound to provide a plurality of radially disposed turns, form inner and outer cylindrical surfaces on each conductor turn, with the outer surface of one turn being adjacent the inner surface of the next outer turn. The high frequency currents are believed to be confined to these inner and outer surfaces of the conductor turns. Thus, instead of uniformly coating the entire surface of a conductive strand with an electrically conductive material having a higher electrical resistivity than the strand itself, as illustrated in FIG. 5, it would be equally suitable to confine this coating only to those surfaces of the conductor which will form the inner and outer surfaces of each conductor turn. Thus, as shown in FIG. 6, conductor 80 has a conductive strand 82 having a width dimension W and a thickness dimension T, which has coatings 84 and 86 disposed on opposite surfaces of the conductive strands which define the width dimension W, which surfaces will be disposed between the conductor turns when the conductor 80 is wound into a pancake coil. The coatings 84 and 86 are selected to have a higher electrical resistivity than the electrical resistivity of conductive strand 82, as hereinbefore described relative to FIG. 5. The coated strand 82 is insulated with a layer of insulation 88, as hereinbefore described relative to conductor 70 shown in FIG. 5.

Figure 7:
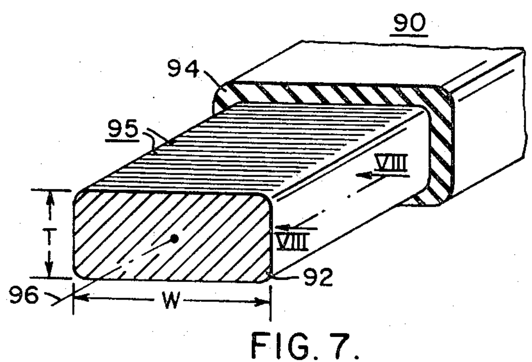
FIG. 7 is a perspective view of an electrical conductor for a pancake coil, which illustrates another embodiment of the invention.

FIG. 7 illustrates another embodiment of the invention, which increases the high frequency resistance of an electrical conductor, without substantially affecting its line frequency resistance, by increasing the length of the high frequency circuit or path. More specifically, FIG. 7 illustrates an insulated electrical conductor 90, comprising an electrically conductive strand 92 which is rectangular in cross-section, having a width dimension W and a thickness dimension T, and a uniform coating or layer 94 of insulation disposed thereon. At least the surfaces of the conductive strand 92 which will be disposed between the conductor turns when the conductor 90 is wound into a pancake coil, are provided with corrugations or ripples 95, with the directions of the corrugations 95 being perpendicular or transverse to the longitudinal axis 96 of the conductive strand 92.

Figure 8:
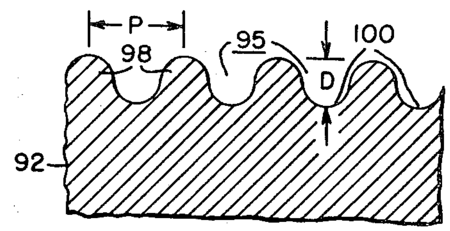
FIG. 8 is a fragmentary, magnified view of the conductor shown in FIG. 7, taken in the direction of lines VIII–VIII; and, FIG. 9 is a perspective view of two adjacent conductors from a pancake coil, which conductors are constructed according to still another embodiment of the invention.

As shown in FIG. 8, which is a greatly enlarged view of the corrugations 95, taken in the direction of the arrows VIII—VIII in FIG. 7, the waves 98 and furrows 100 are preferably semicircular in configuration, in order to provide smooth rounded surfaces which will prevent the voltage gradient on the corrugations from reaching the corona point. If the waves and furrows are semicircular in configuration, the path of the conductor, perpendicular to the direction of the corrugations, will be increased 57%, independent of the radius of the circles, since the perimeter of a semi-circle is equal to $\pi/2$ or 1.57 times the diameter of the circle. The depth D of the corrugations, and the period P of the corrugations, is selected according to the resistivity of the material the conductive strand 92 is constructed of, and also according to the resonant frequency of the pancake coil. A typical depth D, for a pancake coil constructed of copper or aluminum, may be in the order of 3 mils, and since the period P is equal to twice the depth D, the period would be in the order of 6 mils.

Figure 9:
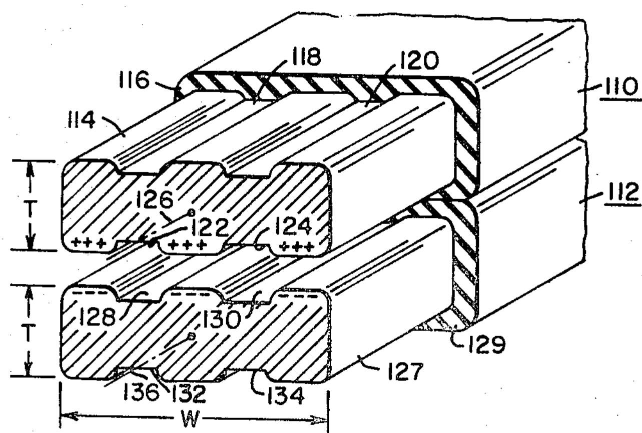

FIG. 9 illustrates still another embodiment of the invention, which increases the high frequency resistance of an electrical coil without substantially increasing its resistance to line frequency currents, with the embodiment shown in FIG. 9 utilizing the fact that high frequency currents of unlike direction attract one another in the nature of unlike charges. When a pancake coil is subjected to a surge potential, the instantaneous direction of the high frequency currents in adjacent conductor turns from the two radial sections will be in opposite directions. Thus, as shown in FIG. 9, which is a perspective view of, in section, two insulated radially adjacent conductors 110 and 112 from a pancake coil, the conductors may have their conductive strands longitudinally grooved or depressed. This will force the high frequency currents to flow in the undepressed areas, due to their attraction for one another, which effectively narrows the width of the conductor and increases its electrical resistance to the flow of high frequency currents.

More specifically, conductor 110 comprises a conductive strand 114, which is generally rectangular in shape, having predetermined width and thickness dimensions W and T, respectively, and a coating or layer 116 of electrical insulating means disposed thereon. The conductive strand 114 has at least one longitudinal groove or depression on each of the surfaces which form the inner and outer surfaces of the conductor turn, with two grooves or depressions on each of the surfaces being shown in FIG. 9. One surface of conductive strand 114 has longitudinal grooves 118 and 120 disposed therein, and the opposed or opposite surface has longitudinal grooves 122 and 124 disposed therein. These longitudinal grooves are parallel with the longitudinal axis 126 of conductive strand 114.

Electrical conductor 112 is similar to conductor 110, comprising an electrically conductive strand 127 having a coating or layer 129 of insulating means disposed thereon. Conductive strand 127 has longitudinal grooves or depressions 128 and 130 disposed on a first surface thereof, and longitudinal grooves or depressions 132 and 134 disposed on the opposed or opposite surface, which grooves are parallel with the axis 136 of conductive strand 127. When the conductors 110 and 112 are disposed in radially adjacent relation, as part of the turns of a pancake coil, the longitudinal ridges or raised portions of the conductive strands formed by the longitudinal depressions will be adjacent to one another, and closer together than the adjacent depressions. Thus, the oppositely flowing high frequency currents, represented by the plus and minus signs in FIG. 9, will be attracted into the longitudinal ridges, and less current will flow in the longitudinal depressions. This effective reduction in the width of the conductive strand increases the resistance of the conductor to the flow of high frequency currents, without substantially affecting its resistance to line frequency currents.

Still another embodiment of the invention for reducing the magnitude of the voltage resonance peak at the first resonant frequency of a pancake coil, without substantially affecting the resistance of the coil to line frequency currents, does not involve any changes in the electrically conductive strands, but utilizes insulation on the strands which is an excellent insulator at line frequencies, but which has relatively high losses at the first resonant frequency of the pancake coil. Thus, as shown in FIG. 2, the insulation 43 selected to electrically insulate the electrically conductive strand 41 should have a much higher dissipation factor at a frequency of about 1 to 3 mHz., than it has at line frequency. Or, if the electrical windings are immersed within a liquid dielectric, which impregnates the coil insulation, the liquid dielectric may be chosen to have a much higher dissipation factor at the first resonant frequency of the pancake coils than at line frequency. Or, both the solid and liquid insulations may be selected to have a higher dissipation factor at the resonant frequency of the coil than at line frequency. Thus, high frequency energy will be absorbed by the insulation, which results in the attenuation of the resonance peak. An example of a solid insulation which may be used is certain of the cellulose acetates which has a dissipation factor at 1 mHz. which is about 5 times its dissipation factor at 60 Hz. An example of a liquid dielectric which may be used is certain of the chlorinated diphenyls, which have a much higher dissipation factor at 1 mHz. than at 60 Hz.

While each of the embodiments have been shown and described separately, it will be obvious that they may be combined in any desirable combination, to increase the high frequency resistance of the pancake coils still further. For example, the longitudinal ridges shown in FIG. 9 may have their surfaces corrugated as shown in FIG. 7, to increase the length of the high frequency circuit while reducing its width, or the conductors shown in FIGS. 8 and 9 may have a thin coating disposed thereon which has a higher electrical resistivity than the conductive strand itself.

In summary, there has been disclosed new and improved structure for reducing the magnitude of electrical stresses in high series capacitance windings of the interleaved turn type, which may be applied to such windings regardless of how each pancake coil of the winding is constructed, or how the pancake coils of the winding are interconnected. Further, the objective of increasing the high frequency resistance of a pancake coil and electrical winding has been achieved without proportionately increasing the 60 Hz. resistance of the coils and winding. In fact, in most of the disclosed embodiments, the effect of the disclosed structures would be negligible on the line frequency performance of the coil, while substantially increasing the high frequency resistance of the coils and winding.

By reducing the peak stresses which a pancake coil may be subjected to, it is possible to reduce the amount of insulation required, since the amount of insulation is largely determined by the maximum impulse stresses which may be encountered. Thus, the size, cost, and weight of the electrical inductive apparatus may be reduced. Also, the disclosed teachings make it possible to build larger windings, which have lower resonant frequencies, while obviating excessive resonance peaks due to the greater energy content of the impulse voltages at the lower resonant frequencies.

Since numerous changes may be made in the above described apparatus and different embodiments of the invention may be made without departing from the spirit thereof, it is intended that all matter contained in the foregoing description or shown in the accompanying drawings shall be interpreted as illustrative, and not in a limiting sense.

I claim as my invention:

1. A winding for electrical inductive apparatus adapted for connection to a source of power frequency alternating potential, comprising:

a plurality of pancake coils each having a plurality of radially interleaved sections, each of said sections having a plurality of radially disposed turns formed from an electrical conductor, said plurality of radially interleaved sections being electrically interconnected to place turns from an electrically distant portion of the winding between electrically adjacent turns, electrical insulating means disposed on the electrical conductors of which said interleaved sections are formed, and means associated with the electrical conductors of which said interleaved sections are formed, which increases their high frequency electrical resistance, without substantially increasing their power frequency electrical resistance, to reduce the resonant voltage peak produced between adjacent conductor turns when the winding is subjected to a surge potential.

2. The pancake coil of claim 1 wherein the means which increases the high frequency electrical resistance of the electrical conductor includes a coating of an electrically conductive material disposed on the outer surfaces of said electrical conductor, said coating of electrically conductive material having a higher electrical resistivity than the electrical resistivity of the electrical conductor.

3. The pancake coil of claim 1 wherein the electrical conductor is substantially rectangular in cross-section, forming inner and outer cylindrical surfaces on each turn, and wherein the means which increases the high frequency electrical resistance of the electrical conductor includes a coating of electrically conductive material disposed on at least the portions thereof which form the inner and outer surfaces of the turns, said coating of electrically conductive material having a higher electrical resistivity than the electrical resistivity of the electrical conductor.

4. The pancake coil of claim 3 wherein the electrical conductor is formed of copper and the coating on the electrical conductor is formed of aluminum.

5. The pancake coil of claim 1 wherein the means which increases the high frequency electrical resistance of the electrical coil, increases the surface length of the electrical conductor in the direction of current flow, at least on the portions of the electrical conductor which are radially adjacent other conductor turns.

6. The pancake coil of claim 1 wherein the electrical conductor is substantially rectangular in cross-section, forming inner and outer cylindrical surfaces on each conductor turn, and wherein the means which increases the high frequency electrical resistance of the electrical conductor includes corrugations disposed on at least the surfaces of the conductor which form the inner and outer cylindrical surfaces, with said corrugations being transverse to the length dimension of the conductor, said corrugations increasing the surface length of the conductor, to increase the resistance of the conductor to high frequency currents which flow near the surfaces of the conductor between adjacent turns.

7. The pancake coil of claim 6 wherein the corrugations are formed of continuous waves and furrows having semi-circular cross-sections, which increases the surface length of the conductor and the high frequency current path by 57%.

8. The pancake coil of claim 6 wherein the depth of the corrugations is about 3 mils and the period of the corrugations is about 6 mils.

9. The pancake coil of claim 1 wherein the means which increases the high frequency electrical resistance of the electrical coils decreases the width of the flow path for high frequency currents, compared with the width of the flow path for line frequency currents.

10. The pancake coil of claim 1 wherein the electrical conductor is substantially rectangular in cross-section, and the means which increases the high frequency electrical resistance of the electrical conductor includes at least one longitudinal depression disposed in each of the surfaces of the conductor which are adjacent other conductor turns, causing high frequency currents in adjacent conductor turns to be attracted to one another and forced to flow in the undepressed portions of the conductor, to effectively reduce the width of the conductor available for the flow of high frequency currents.

11. The pancake coil of claim 1 wherein the electrical insulating means on the conductor has a substantially higher dielectric loss at high frequencies, than at the power frequency.

12. A winding for electrical inductive apparatus, comprising:

a plurality of pancake coils, each having a plurality of radially interleaved sections, each of said radially interleaved sections having a plurality of radially disposed conductor turns formed of an insulated electrical conductor, said plurality of radially interleaved sections being electrically interconnected to place turns from an electrically distant portion of the winding between electrically connected turns, the electrical conductors of which the turns of said interleaved sections are formed including means for increasing their electrical resistance to current flow at the first resonant frequency of the pancake coil, without substantially increasing the electrical resistance of the conductors to the flow of current at the frequency the pancake coil is designed to accommodate, whereby the magnitude of the resonant voltage peaks between adjacent turns of the pancake coil, near the mid-point of the radial build of the pancake coil, are reduced when the pancake coil is subjected to surge potential.

References Cited

UNITED STATES PATENTS

| | | | |
|---|---|---|---|
| 543,960 | 8/1895 | Gray | 174—133 |
| 2,417,785 | 3/1947 | Slepian | 174—133 XR |
| 2,700,212 | 1/1955 | Flynn et al. | 174—110.6 |
| 3,023,386 | 2/1962 | Wentz et al. | 336—187 |
| 3,035,115 | 5/1962 | Heckel et al. | 174—119 XR |
| 3,317,876 | 5/1967 | Olson | 174—119 XR |

FOREIGN PATENTS

| | | |
|---|---|---|
| 1,170,845 | 1/1959 | France. |

THOMAS J. KOZMA, Primary Examiner

U.S. Cl. X.R.

174—119; 336—223